United States Patent [19]

Orr

[11] Patent Number: 5,205,587
[45] Date of Patent: Apr. 27, 1993

[54] MODULAR FRAME FOR AUTOMOTIVE VEHICLES

[75] Inventor: Larry W. Orr, Bellevue, Wash.

[73] Assignee: Paccar Inc., Bellevue, Wash.

[21] Appl. No.: 688,094

[22] Filed: Apr. 19, 1991

[51] Int. Cl.$^5$ .............................................. B62D 21/12
[52] U.S. Cl. ........................................ 280/785; 296/29;
296/204; 403/260; 280/789; 280/790
[58] Field of Search ............... 280/781, 785, 789, 800;
296/29, 204; 403/258, 260, 252, 264, 247

[56] References Cited

U.S. PATENT DOCUMENTS

| | | |
|---|---|---|
| Re. 17,051 | 7/1928 | Ledwinka . |
| D. 174,156 | 3/1955 | Blanchard ............... D54/2 |
| D. 242,034 | 10/1976 | Drawsky ............... D25/74 |
| D. 270,186 | 8/1983 | Jones ............... D25/74 |
| 121,916 | 12/1871 | Tuthill . |
| 309,990 | 12/1884 | Stagg . |
| 442,894 | 12/1890 | Hutchins . |
| 466,624 | 1/1892 | Pennock . |
| 571,884 | 11/1896 | Pennock . |
| 578,990 | 3/1897 | Heron . |
| 1,018,482 | 2/1912 | Cooper ............... 280/781 |
| 1,122,254 | 12/1914 | Chenoweth et al. . |
| 1,143,635 | 6/1915 | Ledwinka . |
| 1,156,259 | 10/1915 | Weston . |
| 1,388,250 | 8/1921 | Godfry ............... 296/29 |
| 1,724,845 | 8/1929 | Lancia . |
| 1,894,602 | 1/1933 | Thomas . |
| 1,908,638 | 5/1933 | Maddock ............... 280/800 |
| 1,933,359 | 10/1933 | Archer ............... 280/800 |
| 1,978,055 | 10/1934 | McKinley ............... 280/106 |
| 1,986,135 | 1/1935 | Burrows ............... 280/106 |
| 2,052,535 | 8/1936 | Sherman ............... 280/106 |
| 2,090,461 | 8/1937 | Sherman ............... 280/106 |
| 2,108,215 | 2/1938 | Stief ............... 296/28 |
| 2,157,649 | 5/1939 | Eksergian ............... 296/28 |
| 2,248,319 | 7/1941 | Waterhouse, Jr. ............... 296/28 |
| 2,355,794 | 8/1944 | Gentry ............... 296/27 |
| 2,359,036 | 9/1944 | Harper ............... 280/781 X |
| 2,700,551 | 1/1955 | Stump ............... 280/800 |
| 2,843,231 | 7/1958 | Maruhn ............... 296/29 |
| 3,713,662 | 1/1973 | Abromavage et al. ............ 280/800 X |
| 3,735,998 | 5/1973 | Green ............... 280/781 X |
| 3,856,344 | 12/1974 | Loeber ............... 296/28 |
| 4,040,640 | 8/1977 | Begg ............... 280/106 R |
| 4,093,253 | 6/1978 | Lehr ............... 280/789 |
| 4,098,555 | 7/1978 | Vollenweider ............... 403/20 |
| 4,147,379 | 4/1979 | Winslow ............... 280/781 |
| 4,163,578 | 8/1979 | Watson ............... 296/204 |
| 4,270,872 | 6/1981 | Kiyosawa ............... 403/170 |
| 4,386,792 | 6/1983 | Moore ............... 280/781 |
| 4,526,418 | 7/1985 | Martin ............... 296/182 |
| 4,531,761 | 7/1985 | von Sivers ............... 280/785 |
| 4,662,650 | 5/1987 | Angehrn et al. ............... 280/785 X |
| 4,893,960 | 1/1990 | Beier ............... 403/24 |
| 4,929,018 | 5/1990 | Carty ............... 296/204 |
| 4,950,026 | 8/1990 | Emmons ............... 296/203 |

FOREIGN PATENT DOCUMENTS

| | | | |
|---|---|---|---|
| 3740401 | 6/1989 | Fed. Rep. of Germany | 296/29 |
| 1062389 | 4/1954 | France | 280/785 |
| 0074475 | 3/1990 | Japan | 280/785 |
| 0117472 | 5/1990 | Japan | 296/29 |
| 211406 | 9/1940 | Switzerland | 296/29 |
| 0816845 | 3/1981 | U.S.S.R. | 280/781 |
| 703605 | 2/1954 | United Kingdom | 296/29 |

*Primary Examiner*—H. Grant Skaggs
*Assistant Examiner*—Carol Lynn Druzbick

[57] ABSTRACT

A modular frame for automotive vehicles, which comprises a pair of side rails oriented parallel to one another, each side rail having a plurality of apertures being substantially similar in size and shape with respect to one another. Cross members and auxiliary mounts are secured to the side rails by adapters that have a size and shape corresponding to the apertures in the side rails. The means for securing the adapters to the side rails allows the load to be distributed over a wide area of the side rail to reduce stress concentrations. The combination of the adapters and the plurality of similar sized apertures results in a modular structural frame connection system for vehicles.

29 Claims, 3 Drawing Sheets

MODULAR FRAME FOR AUTOMOTIVE VEHICLES

DESCRIPTION

1. Technical Field

This invention relates to automotive vehicle frames, and more specifically, to modular automotive vehicle frames and structural connection systems for automotive vehicle frames.

2. Background of the Invention

In the automotive vehicle manufacturing industry, as in all manufacturing industries, standardization of parts and reduction of labor and costs are of primary importance. Traditional vehicle frames and methods for assembling vehicle frames are typically tied individual vehicle models. Different components and different manufacturing procedures must be employed for each type of vehicle.

In the custom, heavy truck manufacturing industry, for example, virtually all truck models require different individual frames, the exception being when an entire fleet of trucks is manufactured. Each truck frame requires a different frame length, wheelbase length, frame width, and locations for and manners in which various vehicle custom components are connected to the vehicle frame.

In manufacturing traditional truck frames, the side rails are cut to a specific length according to the model of vehicle to be made. Each side rail must be custom drilled and modified so that the various custom components can be secured to the side rail at the proper location. This custom drilling and modification is labor intensive and increases production costs considerably.

Another problem with traditional truck frames is that the cross frame members are usually permanently connected to the side rails, or secured in such a way that it makes it difficult to modify the size of the truck frame and location of component parts after the frame is assembled.

Traditional vehicle frames and systems for connecting cross members and component parts to the side rails involve nonstandardized, complicated securing methods. Different holes of different sizes are drilled into the vehicle frame, different types and sizes of auxiliary connection pieces are coupled to the frame in a variety of ways at different locations, and many other unique modifications are made to frame for each vehicle model.

Still another problem with traditional methods of vehicle frame construction is that the cross members and auxiliary mounts are coupled to the side rails directly with connecting bolts. The threaded fasteners tend to gall and damage the inside diameter of the holes in the side rails, which can cause fatigue cracks in the side rails. In addition, a high stress concentration results when small diameter bolts are used to secure the cross members and auxiliary mounts to the side rails.

SUMMARY OF THE INVENTION

It is a primary object of the present invention to provide a modular frame for automotive vehicles.

Another object of the present invention is to provide a vehicle frame whereby the cross members and auxiliary mounting brackets can be mounted to the side rails in a standardized manner.

Still another object of the present invention is to provide an adapter for the cross members such that the adapters engage the side rails so the load imparted to the side rail is distributed over a wide area of the side rail.

Still another object of the present invention is to provide a vehicle frame having multiple apertures substantially similar in size so that the cross members and auxiliary mounting brackets can be mounted to the side rails at any of the available apertures.

Another object of the present invention is to provide a vehicle frame that can be assembled for a first time with a first set of dimensions, disassembled, and reassembled again with a different set of dimensions a number of subsequent times.

Yet another object of the invention is to provide a modular vehicle frame that is lightweight, strong, and capable of assembling into various dimensions to suit a variety of vehicles.

The foregoing objects are achieved by the present modular frame for automotive vehicles, which comprises a pair of side rails oriented parallel to one another, each side rail having a plurality of apertures being substantially similar in size and shape with respect to one another. Cross members are mounted between side rails, the cross members having adapters on each end, the adapters corresponding to the size and shape of the apertures in the side rails. Each adapter is positioned inside an aperture of the side rails and secured in place by means of a single threaded connecting bolt such that the load is distributed throughout the entire area of the side rail engaged by the adapter.

The present invention also comprises an auxiliary mount for connecting to the side rails of the vehicle frame at one of the apertures. The auxiliary mount includes an adapter similar in size and shape to the side rail apertures, the auxiliary mount adapter being secured to the side rail through an aperture by means of a single connecting bolt such that the load is distributed throughout the entire area of the side rail engaged by the adapter.

The combination of the cross member adapters, the auxiliary mount adapters, and the plurality of similar sized apertures results in a modular structural frame connection system for vehicles. A variety of vehicle frames corresponding to a variety of vehicle models can be developed using this novel structural frame connection system. In addition, the frame members may be changed subsequent to the initial assembly to create a different frame for a different model vehicle.

DETAILED DESCRIPTION OF THE INVENTION

Figure 1:
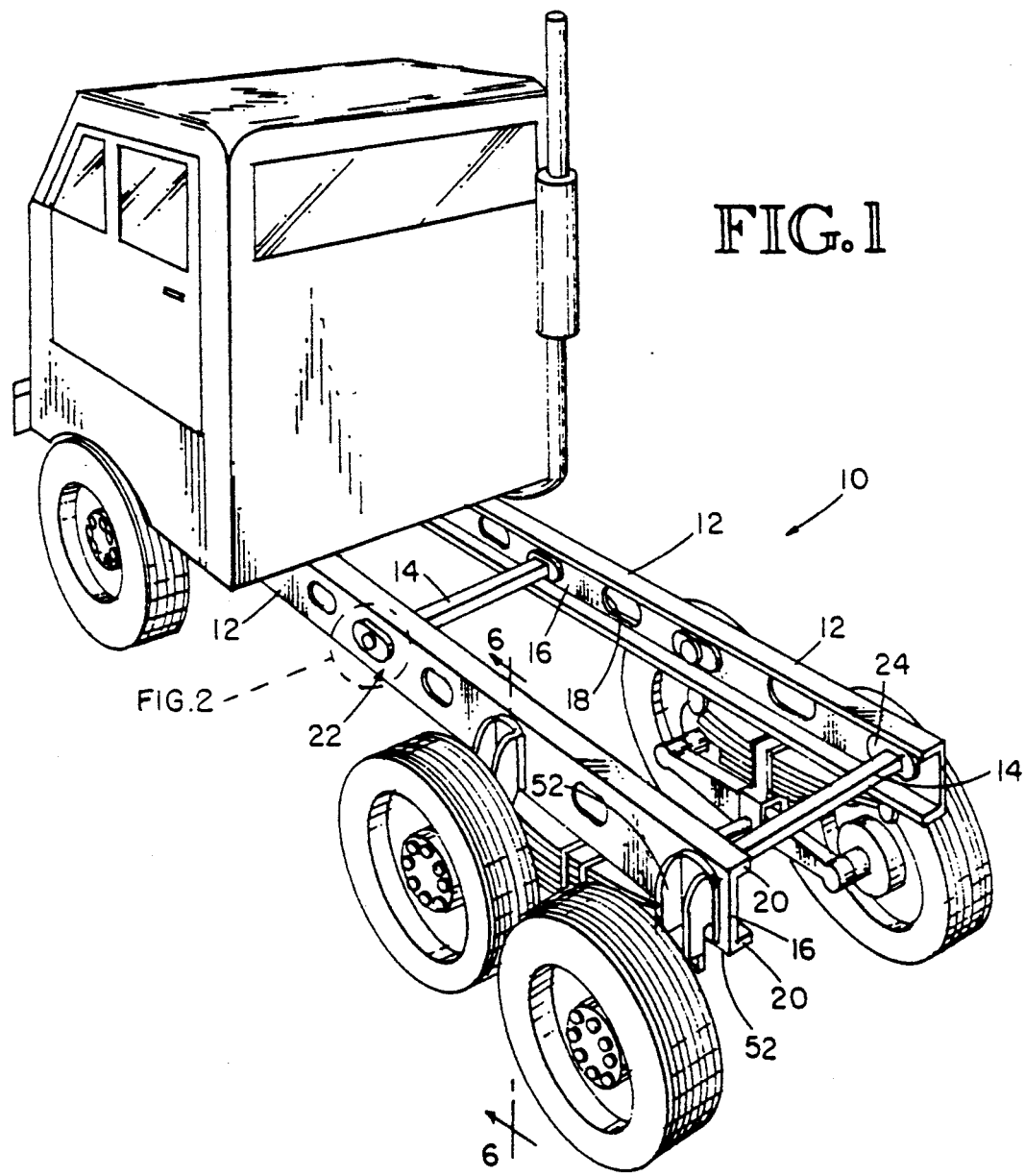
FIG. 1 is a perspective view of the modular vehicle frame of the present invention.

As shown in FIGS. 1-6, the present invention relates generally to a modular vehicle frame 10 comprising a pair of side rails 12 and multiple cross members 14. The side rails define a plurality of apertures 18, which preferably are substantially similar in size and shape with respect to each other. The cross members are secured to the side rails through the apertures by means of cross member adapters 22 coupled to the ends of the cross members. Auxiliary mounts 32 (FIG. 4) are also connected to the side rails through the apertures by means of auxiliary adapters 40. It is a unique feature of the invention that all of the adapters can be identical, if desired, for both cross member attachments and auxiliary mount attachments.

Referring to FIGS. 1, 3, 5, and 6, each side rail 12 comprises a web 16 defining a plurality of apertures 18 and a pair of integral flanges 20 extending perpendicularly of the web 16 and parallel to one another to form a channel-shaped side rail.

Figure 2:
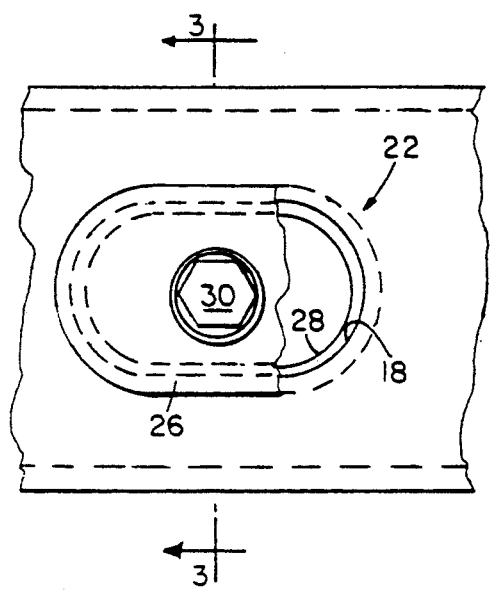
FIG. 2 is a fragmentary side elevation view, partly in section, of the encircled area of FIG. 1 showing the cross frame adapter of the present invention.
Figure 3:
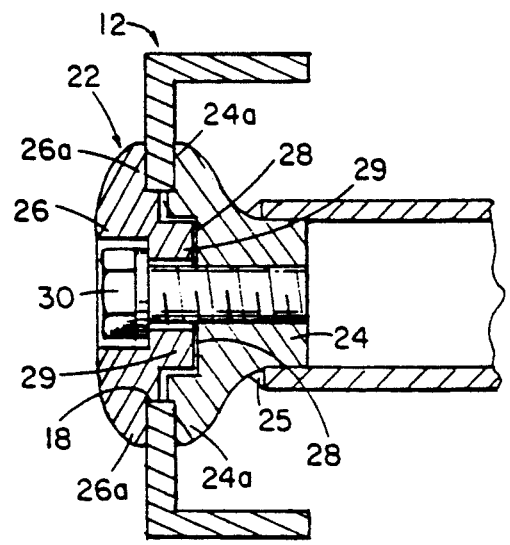
FIG. 3 is a fragmentary sectional side elevation view, taken along the line 3—3 of FIG. 2, of the cross frame adapter of the present invention.

The cross members 14 are secured to the side rails 12 by means of a cross member adapter 22, as shown in FIGS. 1-3. The cross members are shown to be tubular shaped, but could also be made of various other shapes. The cross member adapter 22 comprises an inner coupling member 24 and an outer coupling member 26. The inner coupling member 24 is connected to the cross member by means of a weld 25 or any other conventional securing means. The inner coupling member includes a recess 28 which corresponds substantially with respect to size and shape to an extension portion 29 of the outer coupling member. In one embodiment, the recess 28 and extension portion 29 are oval shaped so that when the outer coupling member is inserted through the aperture 18 into engagement with the inner coupling member, both coupling members are interlocked in a closely fitting relationship to prevent relative rotation with respect to each other. It is to be understood that a number of different shapes may be utilized so the coupling members interlock in a closely fitting relationship to prevent relative rotation. Thus, antirotation of the cross member adapter relative to the side rail may be achieved when a portion of either the inner coupling member or the outer coupling member engages the inside diameter of the aperture. Generally, however, a portion of both the inner coupling member and the outer coupling member engage the inner edge of the aperture 18 to prevent relative rotation between the cross member adapter and the side rail 12 (FIG. 3).

In one embodiment, the inner coupling member 24 and outer coupling member 26 are secured together by means of a single threaded connecting bolt 30, which provides a connection that can be quickly assembled and disassembled. This simple connection allows for standardization of parts and reduces assembly labor. It is to be understood, however, that more than one fastener may be used.

The apertures 18 are centrally located on the neutral axis of the web to reduce the overall weight of the vehicle frame without appreciably affecting the strength of the side rails 12. In one embodiment, the apertures are spaced equidistantly from one another to provide multiple, standard locations at which cross members 14 and auxiliary mounts 32 (FIGS. 4 and 5) can be secured to the side rails. Alternatively, the apertures may be spaced close together at the area of the side rails below the cab portion of the vehicle for securing multiple auxiliary mounts to accommodate multiple custom components, and spaced farther apart along the side rail that extends rearwardly beyond the cab area where relatively fewer mounting locations are required. It is also understood that many other spacing arrangements for the apertures may be utilized to suit a particular model or multiple models of vehicles.

Figure 4:
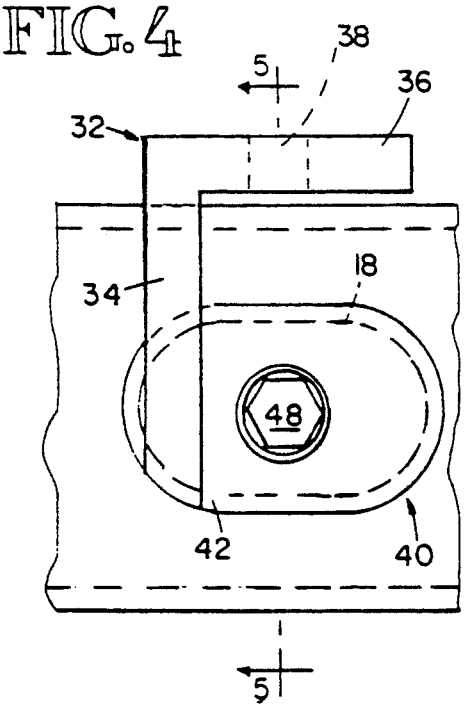
FIG. 4 is a fragmentary side elevation view of an auxiliary mount adapter of the present invention.
Figure 5:
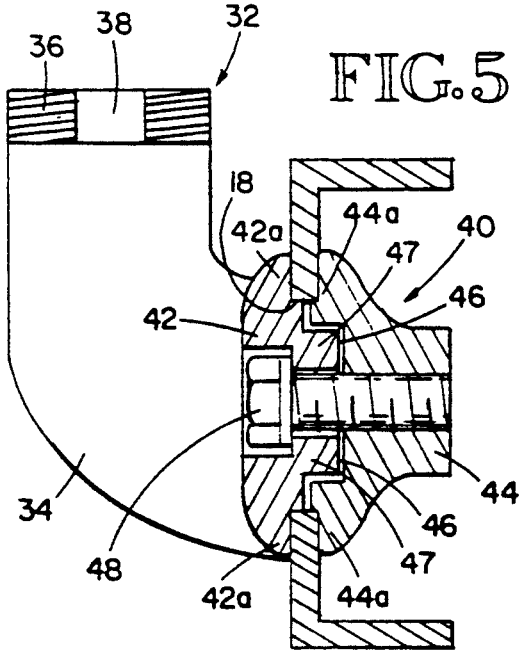
FIG. 5 is a fragmentary cross sectional side elevation view, taken along line 5—5 of FIG. 4, of the auxiliary mount of the present invention.

With reference to FIGS. 4 and 5, another aspect of the present invention involves an auxiliary mount 32 comprising a vertical extension member 34 and a horizontal mounting plate 36 extending perpendicularly of the vertical extension member 34. The horizontal mounting plate 36 defines a mounting location 38 for connecting a plurality of alternative custom vehicle components. Some of these components may include, without limitation, a fuel tank, an engine mount, a cab mount, a hood mount, a battery box, a tool box, suspension parts, mud flap hangers, fairing brackets, steering gears, spring brackets, and radiator mounts.

The auxiliary mount 32 is coupled to the side rail 12 by means of an auxiliary adapter 40 to which the vertical extension member 34 is integrally connected. It is also understood that the vertical extension member could be welded or connected to the auxiliary adapter in another conventional manner. The auxiliary adapter comprises an outer auxiliary coupling member 42 and an inner auxiliary coupling member 44. The inner auxiliary coupling member includes a recess 46 which corresponds to the size of an extension portion 47 of the outer auxiliary coupling member. When the outer auxiliary coupling member is inserted through the aperture 18 to engage the inner auxiliary coupling member, the recess 46 and extension portion 47 interlock in a closely fitting relationship. In one embodiment, the recess 46 and extension portion 47 are oval shaped to prevent relative rotation between each other. Thus, antirotation of the auxiliary adapter relative to the side rail may be achieved when a portion of either the inner auxiliary coupling member or the outer auxiliary coupling member engages the inside diameter of the aperture. Generally, however, a portion of both the inner auxiliary coupling member and the outer auxiliary coupling member engage the inner edge of the aperture 18 to prevent relative rotation between the auxiliary adapter and the side rail 12 (FIG. 5).

The outer auxiliary coupling member 42 and the inner auxiliary coupling member 44 are preferably secured together at a side rail aperture 18 by means of a threaded connecting bolt 48, which provides a quick, efficient means of connecting and disconnecting the coupling members.

Figure 6:
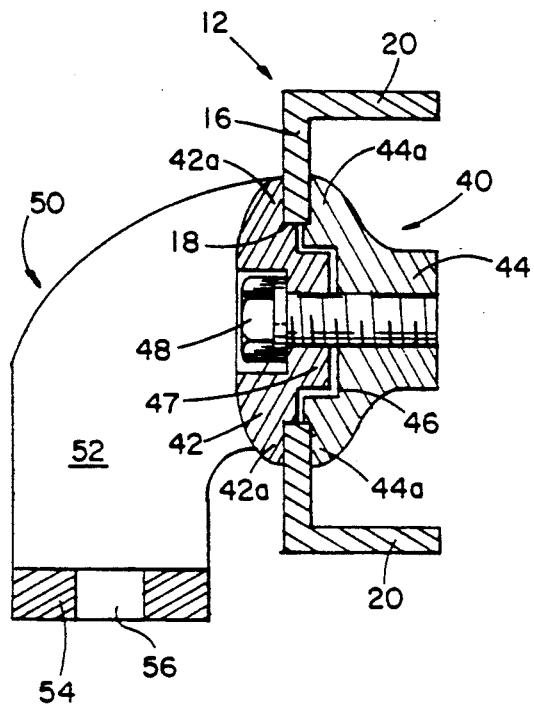
FIG. 6 is a fragmentary cross sectional view, taken along the line 6—6 of FIG. 1, of an alternative auxiliary mount and adapter of the present invention.

FIGS. 1 and 6 show an alternative auxiliary adapter 50 for securing custom components below the elevation of the side rails 12, such as leaf spring mounting members (FIG. 1). The alternative auxiliary adapter 50 includes a pair of downwardly extending members 52 terminating in a horizontal mounting plate 54 for mounting a custom component through a mounting location 56. This auxiliary mounting plate can be coupled to the side rail 12 at an aperture 18 by using with an inner auxiliary coupling member 44, as shown in FIG. 6, or in combination with an inner cross member coupling member 24 as shown in FIG. 1.

Figure 7:
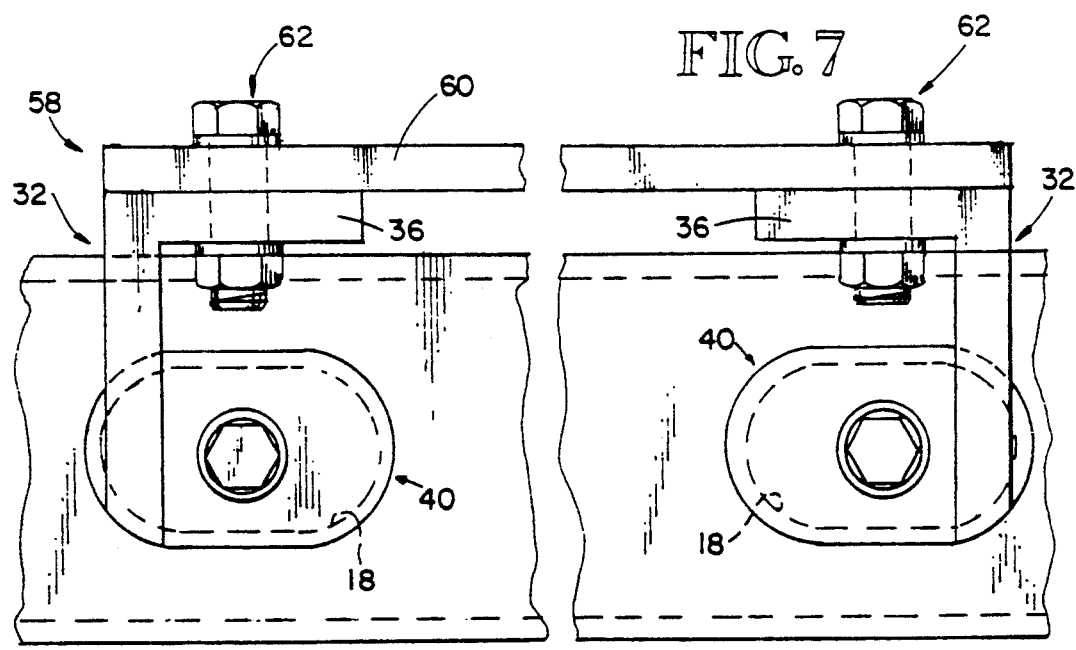
FIG. 7 is a fragmentary side elevation view of another alternative auxiliary mount of the present invention.

FIG. 7 shows yet another alternative dual-aperture auxiliary mount 58 which requires mounting to the side rail 12 through at least two apertures 18. In the embodiment shown in FIG. 7, a pair of auxiliary mounts 32 and corresponding auxiliary adapters 40 are each secured to the side rail through an aperture. A connecting member 60 is secured to each auxiliary mount 32 using a nut-and-bolt connection. It is understood, however, that any conventional method may be used to couple the connecting member to the auxiliary mounts. Further, it is also possible that the horizontal mounting plates 36 could extend continuously between the vertical extension members 34 to form a single, integral mounting surface. The dual-aperture auxiliary mount allows heavy components to be secured to the side rails.

An important aspect of the present invention is that each of the adapters discussed above (the cross member adapter 22 of FIGS. 2 and 3, the auxiliary adapter 40 of FIGS. 4 and 5, and the auxiliary adapter 40 for the alternative auxiliary mount 50 of FIG. 6) may be utilized in conjunction with the apertures 18 to reduce the stress concentrations at the area of the side rail 12 surrounding the aperture. The diameter of the apertures 18 is large as compared to the small bolt hole required for the traditional method of securing cross frame members to the side rails (which typically requires multiple bolts for each connection). In addition, the cross section area of each adapter is larger than the size of the apertures, which creates an overlapping area when the adapters are secured to the side rails. As shown in FIG. 3, an overlapping portion 26a of the outer coupling member 26 and an overlapping portion 24a of the inner coupling member 24 engage the side rail to spread the clamp load over a large area to reduce the stress concentrations around the aperture. An overlapping area 42a of the outer auxiliary coupling member 42 and an overlapping area 44a of the inner auxiliary coupling member 44 (FIGS. 5 and 6) also engage the side rail so as to reduce stress concentrations.

In assembling the modular vehicle frame 10, cross members 14 are mounted to the side rails 12 through the apertures 18 according to the proper length of the vehicle. The cross member adapters 22 of the cross members are inserted into the apertures 18 from both sides of the side rails. The threaded connecting bolt 30 secures the cross member adapter 22 to the side rail which allows for rapid assembly with a minimal amount of labor. Each auxiliary mount 32 is then secured to the side rails by inserting the outer auxiliary coupling member 42 and the inner auxiliary coupling member 44 through a particular aperture 18 from both sides of the side rail and securing thereto by means of the threaded connecting bolt 48. The custom components, of any type, can then be coupled to the vehicle frame.

Once the frame has been assembled for a first time to create a frame of one size, the frame may quickly be disassembled and reassembled a second time to create a vehicle frame of a different size with relatively minimal effort and without destroying the frame or auxiliary mounts. The auxiliary mounts and corresponding custom components can likewise be disassembled and reassembled with relative ease and minimal effort.

As described above, the invention provides a unique modular frame for automotive vehicles and structural frame connection system. While the preferred embodiments of the invention have been illustrated and described, it should be understood that variations will be apparent to persons of ordinary skill in the art. Accordingly, the invention is not to be limited to the embodiments illustrated in the drawings.

I claim:

1. A modular frame for automotive vehicles, comprising:
   a pair of spaced side rails oriented parallel to each other and parallel to a longitudinal axis of a vehicle for substantially the entire length of the vehicle, each side rail defining a plurality of apertures aligned with each other in opposite side rails;
   a cross member capable of being connected between any two oppositely aligned apertures;
   a pair of cross member adapters, each adapter being secured to respective ends of the cross members for securing the cross member to the side rails at the apertures, each cross member adapter being similar in size and shape to the side rail apertures; and
   securing means for securing the cross member adapters to the side rails.

2. The modular vehicle frame according to claim 1 wherein the apertures are substantially the same size and shape.

3. The modular vehicle frame according to claim 1 wherein the apertures are spaced equidistantly from each other along the side rails 4. The modular vehicle frame of claim 1 wherein each side rail comprises a web and two flanges opposite each other extending perpendicularly of the web to form a channel shaped side rail, the web defining the apertures for receiving the cross member adapters.

5. The modular vehicle frame of claim 1 wherein the shape of the apertures and the shape of the cross members adapters prevent rotation of the cross member adapters relative to the side rail.

6. The modular vehicle frame of claim 5 wherein the apertures and the cross member adapters are oval shaped.

7. The modular vehicle frame of claim 6 wherein the oval cross member adapters engage the side rails at an entire oval area of the side rail surrounding the oval apertures so that the stresses imparted to the frame are distributed over the entire oval area to reduce stress concentrations in the side rails.

8. The modular vehicle frame according to claim 1 wherein the cross member adapters are considerably larger in area then the apertures and engage the side rails at an area of the side rail surrounding the apertures so that the stresses imparted to the frame are distributed over a wide area to reduce stress concentrations in the side rails.

9. The modular vehicle frame of claim 1 wherein the securing means comprises a threaded connecting bolt.

10. The modular vehicle frame of claim 1 wherein each cross member adapter comprises an inner coupling member for engaging an inside surface of the side rail and an outer coupling member for engaging an outside surface of the side rail, the inner coupling member defining a recess into which an extension portion of the outer coupling member is inserted to interlock the outer coupling member and the inner coupling member to prevent relative rotation between the coupling members.

11. The modular vehicle frame of claim 10 wherein each aperture, cross member adapter, inner coupling recess, and outer coupling extension portion is oval shaped to prevent the cross member adapter from rotating relative to the side rail.

12. The modular vehicle frame of claim 1, further comprising:
   a auxiliary mount for mounting a custom component to the side rail;

an auxiliary adapter coupled to the auxiliary mount, the auxiliary adapter being substantially the same side as the side rail apertures such that the auxiliary mount can be interchangeably mounted to the side rails at various apertures; and connecting means releasably connecting the auxiliary mount and auxiliary adapter to the side in such a manner that the auxiliary adapter can be removed and relocated at another aperture in the side rail.

13. The modular vehicle frame of claim 12 wherein the auxiliary adapter comprises an inner coupling member for engaging an inside surface of the side rail and an outer coupling member for engaging an outside surface of the side rail, the inner coupling member defining a recess into which an extension portion of the outer coupling member is inserted to interlock the outer coupling member and the inner coupling member to prevent relative rotation between the coupling members.

14. The modular vehicle frame of claim 13 wherein each aperture, auxiliary adapter, inner coupling recess, and outer coupling extension portion is oval shaped to prevent the auxiliary adapter from rotating relative to the side rail.

15. The modular vehicle frame of claim 12 wherein the connecting means comprises a threaded connecting bolt.

16. The modular vehicle frame of claim 12 further comprising multiple auxiliary adapters coupled to multiple auxiliary mounts, the auxiliary mounts being secured together by means of a connecting member such that the auxiliary mounts are secured to the side rail through multiple apertures.

17. The modular vehicle frame of claim 1 wherein the securing means is for releasably securing the cross member adapters to the side rails, the securing means being easily disconnectable so that the cross members can be removed and resecured to the side rails at different apertures.

18. The modular vehicle frame of claim 1 wherein said securing means includes a threaded fastener, and wherein the apertures and cross member adapters are relatively large compared to the size of the threaded fastener so that stresses imparted to the frame are distributed over a wide area to reduce stress concentrations in the side rails.

19. The modular vehicle frame of claim 1 wherein the connecting means is for releasably connecting the auxiliary mount and auxiliary adapter to the side rail in such a manner that the auxiliary adapter can be removed and remounted to an aperture in the side rail other than the apertures to which the cross member adapters are secured.

20. A modular frame for automotive vehicles, comprising:
a pair of side rails oriented parallel to each other and parallel to a longitudinal axis of a vehicle, each side rail defining a plurality of apertures;
a cross member interconnecting the side rails;
a pair of cross member adapters, each adapter being secured to respective ends of the cross members for securing the cross member to the side rails, the cross member adapters being similar in size to the side rail apertures;
securing means for securing the cross member adapters to the side rails;
an auxiliary mount for mounting a custom component to the side rail;
an auxiliary adapter coupled to the auxiliary mount, the auxiliary adapter being substantially the same size as the side rail apertures such that the auxiliary adapter can be mounted to the side rail at various aperture locations; and
connecting means connecting the auxiliary mount and auxiliary adapter to the side rail.

21. The modular vehicle frame of claim 20 wherein each cross member adapter and each auxiliary adapter comprise an inner coupling member for engaging an inside surface of the side rail and an outer coupling member for engaging an outside surface of the side rail, the inner coupling member defining a recess into which an extension portion of the outer coupling member is inserted to interlock the outer coupling member and the inner coupling member to prevent relative rotation between the coupling members.

22. The modular vehicle frame of claim 21 wherein each aperture, cross member adapter, auxiliary adapter, inner coupling recess, and outer coupling extension portion is oval shaped to prevent the adapters from rotating relative to the side rail.

23. A method of assembling a modular vehicle frame of the type having spaced, elongated side rails, comprising the steps of:
providing a plurality of different shaped support members for attaching to the side rails, the side rails having at least a plurality of mounting holes of generally identical size and shape;
providing a plurality of common, uniform adapters of generally identical size and shape and of the same size and shape as the mounting holes in the side rails;
providing a plurality of fasteners to join the adapters to the side rails within some but not all of the mounting holes, and securing the plurality of different shaped support members to the side rails using the common, uniform size and shape adapters to match the same size and shape holes in the side rails by connecting the fasteners through the adapters to the side rails in a manner to render the adapters readily removable and repositionable along the side rails.

24. The method of claim 23 wherein the support members include elongated cross members to be joined at opposite ends to each side rail, and further include external auxiliary mounting members for attaching other components to the side rails, and wherein the step of securing the support members to the side rails includes using the common, uniform size and shape adapters for both the cross members and the external auxiliary mounting members.

25. A structural frame connection system for automotive vehicles, comprising:
a common, uniform adapter for mounting cross frame members and auxiliary mounting members to side rails of a vehicle frame;
the side rails having a plurality of apertures having substantially the same size and shape;
the adapter being substantially similar in size and shape with respect to the apertures and comprising an inner coupling member and an outer coupling member, the inner coupling member and the outer coupling member being secured to the side rail to engage an inside diameter of the aperture to prevent relative rotation between the adapter and the side rail; and the adapter being interchangeably mounted to any of the apertures.

26. The structural frame connection system according to claim 25 wherein the apertures and the adapter are oval shaped to prevent relative rotation with respect to each other.

27. The structural frame connection system according to claim 25 wherein the inner coupling member defines a recess and the outer coupling member defines an extension portion such that when the inner and outer coupling members are secured to the side rail, the extension portion engages the recess in a close fitting relationship to prevent relative rotation between the inner coupling member and the outer coupling member.

28. A cross member assembly for a modular frame for automotive vehicles, the modular frame having a pair of spaced side rails oriented parallel to each other and parallel to a longitudinal axis of a vehicle, each side rail defining a plurality of apertures aligned with each other in opposite side rails, comprising:
   a cross member capable of being connected between any two oppositely aligned apertures; and
   a pair of cross member adapters, each adapter being secured to respective ends of the cross member for securing the cross member to the side rails at the apertures, each cross member adapter being non-circular and being similar in size and shape to the side rail apertures so that the adapters do not rotate within the apertures.

29. The cross member assembly of claim 28 wherein the shape of the cross member adapters and the shape of the apertures are oval.

* * * * *

UNITED STATES PATENT AND TRADEMARK OFFICE
CERTIFICATE OF CORRECTION

PATENT NO. : 5,205,587

DATED : April 27, 1993

INVENTOR(S) : Larry W. Orr

It is certified that error appears in the above-indentified patent and that said Letters Patent is hereby corrected as shown below:

In column six, claim five, lines 29 and 30, please delete "members" and substitute therefor --member--.

In column six, claim eight, line 43, please delete "then" and substitute therefor --than--.

In column seven, claim 12, line three, please delete the first occurring "side" and substitute therefor --size--.

Signed and Sealed this

Eighteenth Day of January, 1994

Attest:

BRUCE LEHMAN

*Attesting Officer*     *Commissioner of Patents and Trademarks*